3,076,279
TRANSPARENCY MOUNTS
Leonard N. Afton, % Admiral Photo Products Co., 1035 W. Lake St., Chicago, Ill.
Substituted for abandoned application Ser. No. 734,808, May 12, 1958. This application Mar. 6, 1961, Ser. No. 95,771
2 Claims. (Cl. 40—158)

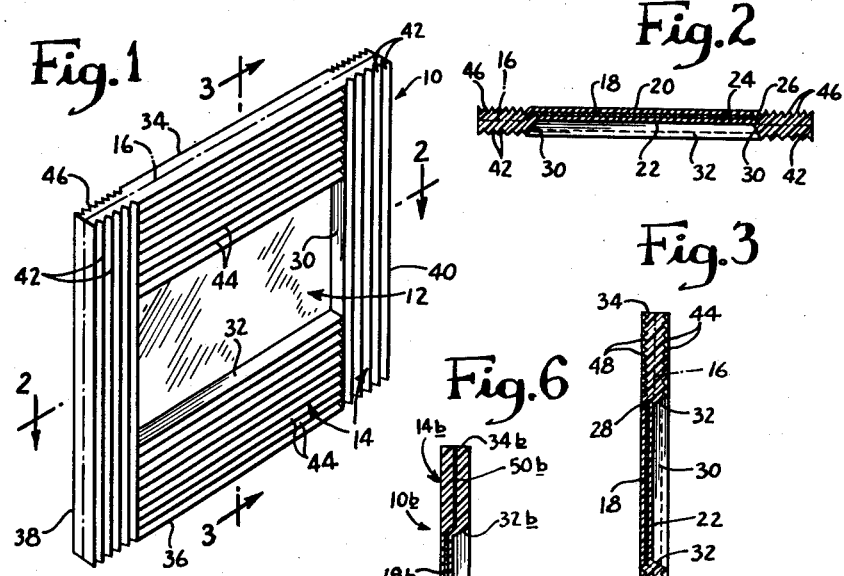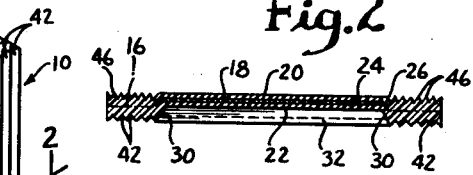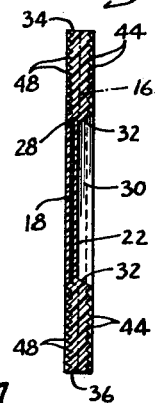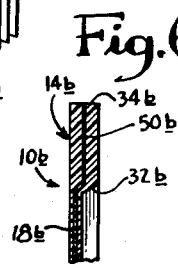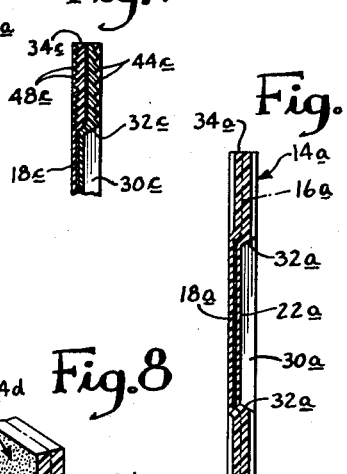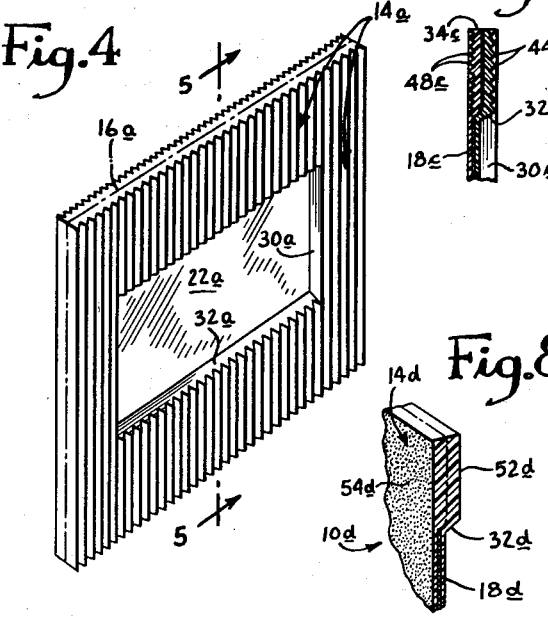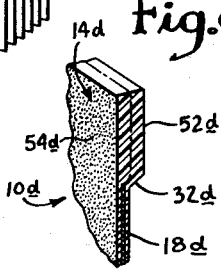
Feb. 5, 1963 — L. N. AFTON — 3,076,279
TRANSPARENCY MOUNTS
Filed March 6, 1961
INVENTOR
LEONARD N. AFTON
by: Fred Gerlach
ATTY.

The present invention relates to film holders and has particular reference to a novel form of mounting for films of the type commonly known as color transparencies which are adapted to be inserted in a still projector or viewer. The invention has been designed for use primarily in connection with the mounting of color transparencies of the 36 mm. type which, at the present time, are most frequently mounted in holders for film preservation and viewing purposes but it will be understood that the invention is by no means limited to such use and film holders constructed in accordance with the principles of the invention may, with or without modification, be employed for mounting pictures of a wide variety of types and sizes. Irrespective, however, of the particular use to which the present invention may be put, the essential features thereof are at all times preserved.

Transparencies of the type with which the present invention is concerned are ordinarily in the form of a thin, flexible, perishable photographic film, either colored or of the black and white variety, and it is present-day practice to mount such transparencies in holders constructed of cardboard, metal, glass, or a combination of such substances, such holders or mounts variously serving manifold purposes such as protection of the film from contamination, lending rigidity to the film, facilitating storage, filing, cataloging or indexing of the film, rendering the film susceptible to ease of handling, adapting the film for use in a still projector, slide viewer or the like, or otherwise enhancing the appearance and utility of the film. Cardboard mounts possess numerous limitations in that they are not durable, are easily bent, afford little or no protection to the film against the heat generated in high wattage projectors, and frequently lose their shape so that they jam in the projection apparatus. Mounts having glass components are subject to breakage, present especial difficulty in centering the film accurately on or between the glass plates, and are expensive to manufacture. Metal mounts, while durable, are expensive, heavy, possess sharp corners or edges which damage the film, and sometimes present objectionable secondary lighting or image effects in the projection apparatus. Many of such mounts require special care in assembling the constituent parts thereof, particularly insofar as centering of the film within the viewing opening is concerned, and also insofar as effecting proper margin-shielding or masking of the film to prevent margin projection in the projection apparatus or the admission of margin lighting effects in the viewer.

The present invention is designed to overcome the above noted limitations that are attendant upon the construction, assembly and use of mounts of the character outlined above, and toward this end, it contemplates the provision of a novel form of transparency mount which, in one form thereof, is constructed entirely of transparent thermoplastic material and which, in other modified forms thereof, is constructed substantially entirely of such material, and which, despite the use of transparent material, affords adequate marginal masking or light intercepting qualities.

The provision of a transparency mount of the character briefly set forth above being among the principal objects of the invention, it is another object thereof to provide such a mount which, when the film is assembled therein, presents relatively thin transparent protective panels between which the film is sandwiched in coextensive relationship, with the panels bearing against the opposite sides of the film respectively and serving to maintain the film flat so that the same cannot curl or otherwise become deformed and also serving to protect the film against scratching, marring or other forms of defacement, as well as shielding the same against contamination by foreign substances, fingerprints, or the like.

A further object of the invention is to provide a transparency mount of this type in which the aforementioned film-protecting panels are common to and are integrally formed with a marginal, reinforcing, film-masking, border-providing, frame-like portion of slightly greater thickness than the combined thickness of the panels and film, this marginal region lending rigidity to the mount as a whole, with the film being so disposed relative to the panels and the marginal thickened portion so that it is completely embedded within the thermoplastic material of the mount and permanently hermetically sealed within the same.

A similar and related object of the invention is to provide a mount of this character in which the marginal rigidifying border regions of the mount, although formed of transparent material, is so designed or shaped as to present light deflecting and reflecting phenomena whereby beams of light emanating from the projector or viewer illuminating source will be reflected or deflected from the surface of the marginal portion of the mount and thus prevent it from being projected directly through this marginal portion so that on the projection screen or in the viewer's eye, this marginal portion will present translucent characteristics.

Yet another object of the invention, in a transparency mount of this sort is to provide a structure, the overall width of which is sufficiently small that it is capable of use in any of the conventional well-known slide projectors or viewers on the market and in which the surrounding thermoplastic material affords excellent heat shielding characteristics to the film so that the amount is suitable for use in connection with so-called high wattage projectors.

The provision of a transparency mount which readily lends itself to large-scale production by a continuous shaping, molding or rolling operation, and which, therefore, may be made in quantity at a relatively low cost; one which is of unitary construction and which, therefore, is rugged and durable so that it will last indefinitely; one in which the masking regions thereof are sharply defined from the viewing regions; one which is of light weight construction; one which is attractive in its appearance and pleasing in its design, and one which otherwise is well adapted to perform the services required of it are further desirable features which have been borne in mind in the production and development of the present invention.

Other objects and advantages of the invention, not at this time enumerated, will become more readily apparent as the following description ensues.

In the accompanying single sheet of drawing forming a part of this specification, several embodiments of the invention have been shown.

In this drawing:

FIG. 1 is a perspective view of a transparency mount constructed in accordance with the principles of the present invention;

FIG. 2 is a sectional view taken substantially along the line 2—2 of FIG. 1;

FIG. 3 is a sectional view taken substantially along the line 3—3 of FIG. 1;

FIG. 4 is a perspective view similar to FIG. 1 showing a slightly modified form of transparency mount constructed in accordance with the principles of the present invention;

FIG. 5 is a sectional view taken substantially along the line 5—5 of FIG. 4;

FIG. 6 is a fragmentary sectional view similar to FIGS. 3 and 5 showing a further modified form of transparency mount;

FIG. 7 is a fragmentary sectional view similar to FIG. 6 of another modified form of transparency mount; and FIG. 8 is a fragmentary perspective view showing yet another modified form of transparency mount.

Referring now to the drawings in detail and in particular to FIGS. 1 to 3, inclusive, wherein one form of a transparency mount constructed in accordance with the principles of the present invention has been shown, the mount has been designated in its entirety at 10 and is in the form of a single one-piece, generally flat, rectangular body which may be formed of a suitable thermoplastic material having low shrinkage characteristics and capable of withstanding the relatively high heat to which mounts of this type are liable to be subjected when employed in still projectors or slide changers of the type mentioned above, and particularly, projectors of the high wattage type. As will be set forth in detail presently, the body 10 is provided with a central rectangular viewing or picture area 12 and a surrounding marginal masking area 14.

The one-piece body 10 may conceivably be formed by various molding operations, such as compression molding, injection molding, and the like, but the same is particularly suitable for a continuous sheet molding or rolling operation wherein the body is made up from two separately formed sections or laminations, each of which may issue continuously from respective pairs of heating rolls having the necessary surface characteristics to impart to their respective laminations the desired surface contours. The two laminations may be brought together into intimate face-to-face contact while at the same time the various film fragments which are to be mounted may be accurately positioned or sandwiched between the laminations, and the laminations thereafter pressed together, either under the application of heat or the use of a softening agent or solvent, so as to seal the film fragments in position between the laminations, and thereafter, the continuous composite structure may be severed successively to produce the individual mounts. The illustration of FIG. 1 is predicated upon such a continuous method of formation of the transparency mount and, accordingly, the theoretical division plane between the two preformed sections has been illustrated in dotted lines and designated at 16, although it will be understood that such a division plane will be scarcely visible in the completed mount.

As best seen in FIGS. 2 and 3, the rectangular picture area 12 is relatively thin and the rectangular dimensions thereof are substantially equal to or slightly less than the rectangular dimensions of the film fragment 18 associated with the mount. This film fragment 18, which may be a 35 mm. cellulose ester derivative film element, is positioned between the two picture viewing portions of the preformed transparency mount counterparts, or is otherwise embedded in the thermoplastic material in the central picture viewing region 12 thereof so that a film-like covering or panel extends completely across the rear side of the film element 18 as at 20 and across the front side of the film element 18 as at 22. Each panel 20 and 22 makes coextensive face-to-face contact with the adjacent surface of the film fragment 18 so that air bubbles and the like are completely excluded. When formed by the continuous process outlined above, the film fragment 18 is contained within a sealed pocket 24 of no greater thickness than the thickness of the film fragment but of slightly greater longitudinal and transverse extent so that small clearances will be provided at the ends and sides of the film fragment as indicated at 26 and 28 in FIGS. 2 and 3, respectively, to allow for slight planar expansion and contraction of the film due to differences in the coefficient of expansion of the cellulose ester film material and of the thermoplastic material from which the body 10 may be formed.

The body 10 is provided with a rectangular depression in the front face thereof which depression, in itself, affords the picture area 12, and by virtue of such depression the two transparent panels 20 and 22, together with their interposed film fragment 18, are offset laterally from the medial plane of the body 10. The end walls 30 and the side walls 32 of the depression 12 are inclined at a predetermined angle relative to the medial plane of the body 10 so that these side walls 30 and 32, in effect, present a sunken bevelled border for the picture area or depression 12. The specific angle made by these inclined surfaces 30 and 32 relative to the medial plane of the body 10 is not critical beyond a predetermined minimum angle, this angle being such that light rays issuing from a source such as a projector light source and travelling toward the front face of the block 10 normal to the medial plane thereof will strike the surfaces 30 and 32 at such an oblique angle that almost total reflection of these light rays away from the surfaces 30 and 32 will take place, with very little light entering the transparent thermoplastic media. It is well known that a ray of light in a medium of one refractive index and directed toward a medium of a different refractive index, passes into the second media with refraction, provided the angle of incidence is not too large. If the ray is inclined more and more, however, a position will be reached in which it does not pass into the second medium, but is totally reflected at the surface of separation. The angle at which total reflection takes place is called the critical angle of incidence. In general, total reflection will occur at the boundary separating two media having different refractive indices, when any ray in one medium is directed toward the other medium at an angle of incidence greater than the critical angle. The angle of deviation of the surfaces 30 and 32 from a plane normal to the medial plane of the body 10 should, therefore, be at least as great or slightly greater than the critical angle of incidence for the thermoplastic media relative to air. When such an angle is maintained, substantially all of the light issuing from a source such as the light source of a slide projector will strike the surfaces 30 and 32 and be totally reflected and directed into the picture area 12 instead of being deflected into the body of the thermoplastic material.

The rectangular border region 14 of the body 10 is appreciably thicker than the overall thickness of the picture viewing portion 12 of the body, but the thickness of this border region is held to a predetermined minimum wherein the necessary overall rigidity of the transparency mount is maintained. The rectangular thickened border region 14 provides a frame-like structure having parallel side member 34 and 36, respectively, and parallel end members 38 and 40, respectively.

Still referring to FIGS. 1 to 3, inclusive, the front faces of the end members 38 and 40 are formed with a series of adjacent, elongated, parallel, lenticular, ribs 42 of substantially V-shape cross sectional shape and having linear apices. These lenticular ribs are coextensive with the side members 38 and 40 and extend transversely of the body 10 as a whole. The first or innermost rib 42 of each series of ribs has one face thereof in common with the adjacent inclined surface 30. Similarly, the front faces of the end members 34 and 36 are formed with respective series of ribs 44 which are identical with the ribs 42 both as regards their cross sectional configuration and their spacing, with the latter ribs 44 bridging the distance between the adjacent innermost ribs 42. The innermost rib 44 of each series has one surface thereof in common with the adjacent inclined surface 32.

The rear faces of the end members 38 and 40, as well as of the side members 34 and 36, are provided with respective series of ribs 46 and 48, respectively. To avoid needless repetition of description, it is deemed sufficient to state herein that the ribs 46 and 48 are similar to the ribs 42 and 44, are similarly disposed on the rear faces of the side and end members, and have their apices lying in the common plane of the outer face of the rear panel 20. The angle between the adjacent faces of the adjacent ribs 42 may be the same as between the adjacent faces of adjacent ribs 44, the angle selected for illustration herein being 45°. The angle between the adjacent faces of adjacent ribs 46 may be the same as the angle between adjacent faces of adjacent ribs 48, the selected angle shown herein being 60°. The purpose of utilizing different angles will be made clear presently.

When the transparency mount 10 is operatively mounted in a slide projector or viewer, the various ribs 42, 44, 46 and 48 provide, in effect, a series of prisms or lenses by means of which substantial opacity is accorded the border region 14 of the mount 10. Light issuing from the projector source and striking the surfaces 30 and 32 is, as previously described, directed inwardly toward the picture viewing area 12, since it strikes these surfaces at an angle which is less than the critical angle of incidence. The inclination of the side of the individual lenticular ribs 42 and 44 relative to the medial plane of the body 10 is also such that light normal to the body 10 as a whole will strike these surfaces at an angle which is less than the critical angle of incidence. The reflected light will be directed to the next adjacent inclined surface and since the angle involved may exceed the critical angle of incidence, some of this light may be deflected into the transparent media. However, such deflected light will undergo a subsequent deflection after it passes through the border regions 14 of the body 10 and encounters the interface between the surfaces of the ribs 46 or 48, as the case may be, on the rear face of the body 10 and very little, if any, light will emerge for projection on the screen of the projector. In any event, the lenticular series of ribs on the front and rear faces, respectively, of the body 10 will cooperate with each other to exclude direct passage of light through the border regions 14 and any such light as may find a path through the body 10 will be so materially dispersed, broken up, and otherwise reduced in intensity that it will have no appreciable effect as a projection on the screen.

In the form of the invention shown in FIGS. 4 and 5, the same optical principles of masking obtain as in the form of the invention shown in FIGS. 1 to 3, inclusive. The mount 10a is similar in its construction to the mount 10 and to avoid needless repetition of description, identical characters of reference with different suffixes have been applied to the corresponding parts in the two views. In FIGS. 4 and 5, the picture viewing portion 12a remains substantially the same as do the various ribs 42a and 46a on the front and rear sides of the body 10a, respectively. The ribs 44a and 48a are disposed in parallelism to the ribs 42a and 44a so that all of the ribs on each side of the mount 10a extend in parallelism. The inclined or bevelled surfaces 30a and 32a which provide a border for the picture viewing panel 22a have not been altered. The optical effect produced by the various ribs 42a, 44a, 46a, and 48a varies from the ribs associated with the mount 10a only insofar as directional characteristics of reflection and deflection are concerned and the overall effect is to produce a border region 14a which is substantially opaque.

In FIG. 6, wherein a further modified form of transparency mount 10b has been illustrated, the various lenticular ribs have been omitted and the border regions 14b of the mount 10b have embedded therein a rectangular open frame-like sheet 50b of a substance which is totally opaque, as, for example, metal foil. In this form of the invention, the inclined or bevelled surfaces 30b and 32b remain substantially the same and the inner border of the metal foil or other opaque sheet 50b terminates within the projected lateral confines of the inclined surfaces 30b and 32b so that these latter inclined surfaces are relied upon to reflect light and prevent the same from passing through the body 10b at the region just inside the inner margin of the sheet 50b.

In the form of the invention shown in FIG. 7, a rib structure similar to those shown in FIGS. 1 and 4, respectively, may be maintained on the front and rear surfaces of the transparency mount 10c. However, in the manufacture of the mount, instead of heat sealing the front and rear mount sections together in the border regions 14c thereof, a suitable transparent adhesive cement for a softening agent such as has been shown at 16c is employed.

In FIG. 8, yet another modified form of the invention has been shown wherein the transparency mount is of unitary one-piece transparent thermoplastic construction with the lenticular series of ribs omitted. In this form of the invention, the front and rear faces of the border regions 14d have been treated as at 52d and 54d, respectively, to provide a frosting or similar diffusing effect on these surfaces to disperse light and render the border regions 14d, as a whole, translucent. The inner margin of the diffused portion 54d falls within the projected lateral confines of the inclined or bevelled surfaces 30 and 32 and the prism effect of these latter surfaces 30 and 32 may be relied upon to exclude light from passing through the mount 10d in the immediately vicinity of the inner edges of the treated surface 54d. Various methods of rendering the surfaces 52d and 54d translucent are contemplated and among these are sanding or otherwise roughening of these surfaces, spraying them with an opaque or translucent paint, or coating them with a suitable adhesive and thereafter spraying the coated surfaces with a translucent or opaque dispersion of solid particles.

It may be found further desirable, due to manufacturing or other expediencies or to attain different and varying optical effects to form the various lenticular ribs of circular or other cross section as may be desired. Other modifications are contemplated within the scope of the appended claims.

Having thus described the invention what I claim as new and desire to secure by Letters Patent is:

1. A transparency mount assembly comprising a rectangular, generally flat body of transparent refractive thermoplastic material having a relatively thin centrally disposed rectangular film-viewing area surrounded by a relatively thick masking border area, a rectangular transparency film embedded in said relatively thin film-viewing area and substantially coextensive with the same, the front face of said film-viewing area being bounded by bevelled surface areas which are inclined forwardly and outwardly and intersect the front face of said relatively thick masking area, the angle of inclination of each bevelled surface area relative to a medial plane of the body being less than the critical angle of incidence of the refractory thermoplastic material, and a series of light-deflecting ribs coextensive with the entire front face of said border area, said ribs being arranged in contiguity and having flat sides of opposite inclination relative to a transverse plane of the body, said sides intersecting to provide sharp linear crest and trough extremities.

2. A transparency mount assembly as set forth in claim 1 including, additionally, a series of light-deflecting ribs coextensive with the entire rear face of said border area, said ribs being arranged in contiguity and having flat sides of opposite inclination relative to a transverse plane of the body, said sides intersecting to provide sharp linear crest and trough extremities.

References Cited in the file of this patent

UNITED STATES PATENTS

| | | |
|---|---|---|
| 560,080 | Booher | May 12, 1896 |
| 1,878,368 | Bielski | Sept. 20, 1932 |
| 2,250,298 | Ditly | July 22, 1941 |
| 2,313,947 | Klenkkum | Mar. 16, 1943 |
| 2,499,452 | Bonnet | Mar. 7, 1950 |
| 2,588,545 | Lawrence | Mar. 11, 1952 |
| 2,845,734 | Brady | Aug. 5, 1958 |

FOREIGN PATENTS

| | | |
|---|---|---|
| 16,092 | Great Britain | Dec. 8, 1886 |
| 10,486 | Great Britain | May 3, 1913 |